United States Patent [19]

Lenhardt

[11] Patent Number: 5,172,861
[45] Date of Patent: Dec. 22, 1992

[54] AGRICULTURAL SPRAYER

[75] Inventor: Theodore F. Lenhardt, Winter Garden, Fla.

[73] Assignee: AG-Spray Corporation, Immokalee, Fla.

[21] Appl. No.: 605,083

[22] Filed: Oct. 26, 1990

[51] Int. Cl.$^5$ .............................................. B05B 9/03
[52] U.S. Cl. .................................................... 239/78
[58] Field of Search ........................... 239/77, 78, 172; 415/60, 182.1

[56] References Cited

U.S. PATENT DOCUMENTS

| | | | |
|---|---|---|---|
| 519,650 | 5/1894 | Spang | 415/60 |
| 957,607 | 5/1910 | Higgins | 415/60 |
| 3,088,676 | 5/1963 | Nottingham | 239/78 |
| 3,310,231 | 3/1967 | Wininger | 239/78 X |
| 3,321,137 | 5/1967 | Carter | 239/78 |
| 3,489,351 | 1/1970 | Patterson | 239/78 X |
| 4,823,268 | 4/1989 | Giles et al. | 239/77 X |
| 4,989,783 | 2/1991 | Douglas | 239/77 |
| 5,014,914 | 5/1991 | Wallenas | 239/172 X |

FOREIGN PATENT DOCUMENTS 222622 11/1986 European Pat. Off. .
2214047 8/1989 United Kingdom ................. 239/77

Primary Examiner—Andres Kashnikow
Assistant Examiner—Kevin P. Weldon
Attorney, Agent, or Firm—Allen, Dyer, Doppelt, Franjola & Milbrath

[57] ABSTRACT

An agricultural sprayer for injecting pesticide into an airstream being directed at foliage to protect the foliage from insects, vermin or the like. The air is generated using fans that pulls in air axially and directs the air outward in a radial direction. The radial outwardly directed air is then fed through a plurality of rotating vertically aligned elliptical paddles to create turbulence in the air. Pre-charged liquid pesticide droplets are then injected through a plurality of nozzles into a second airstream which directs the droplets into the outwardly directed air to regulate the droplet size. An oscillating sensor detects the foliage location and turns nozzles "off" and "on" to spray different foliage locations.

20 Claims, 3 Drawing Sheets

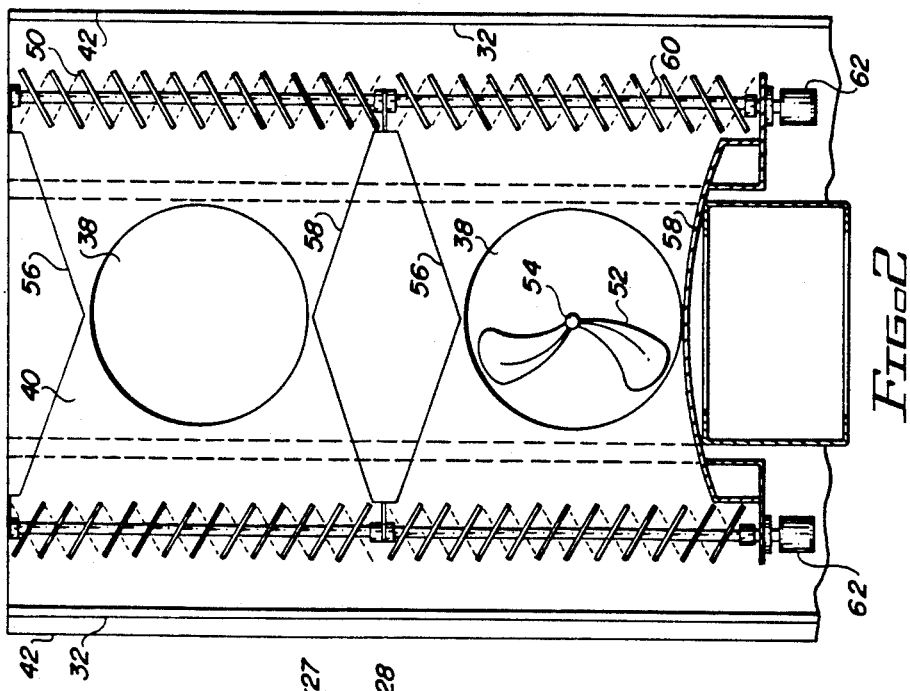
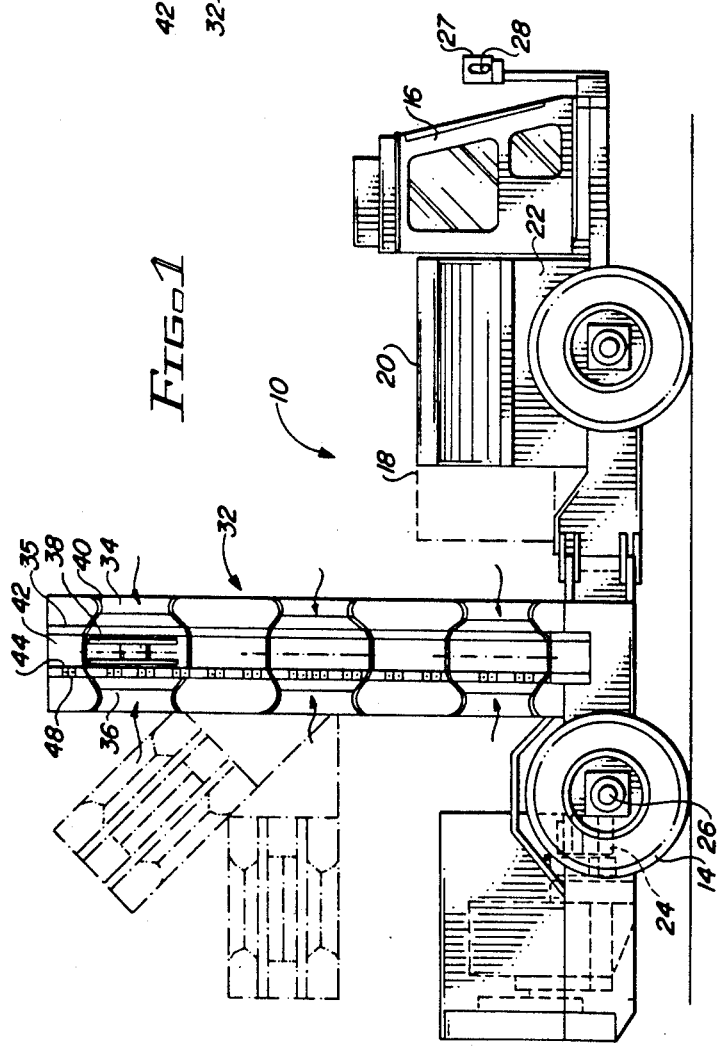
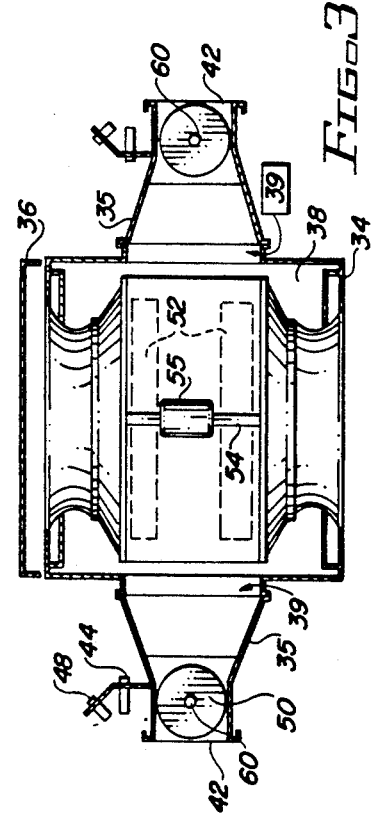

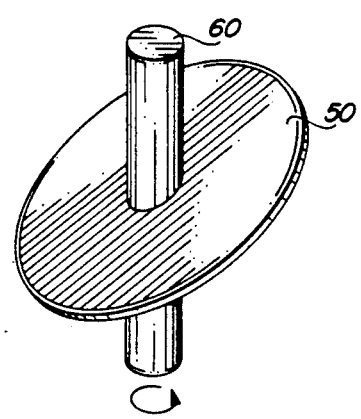
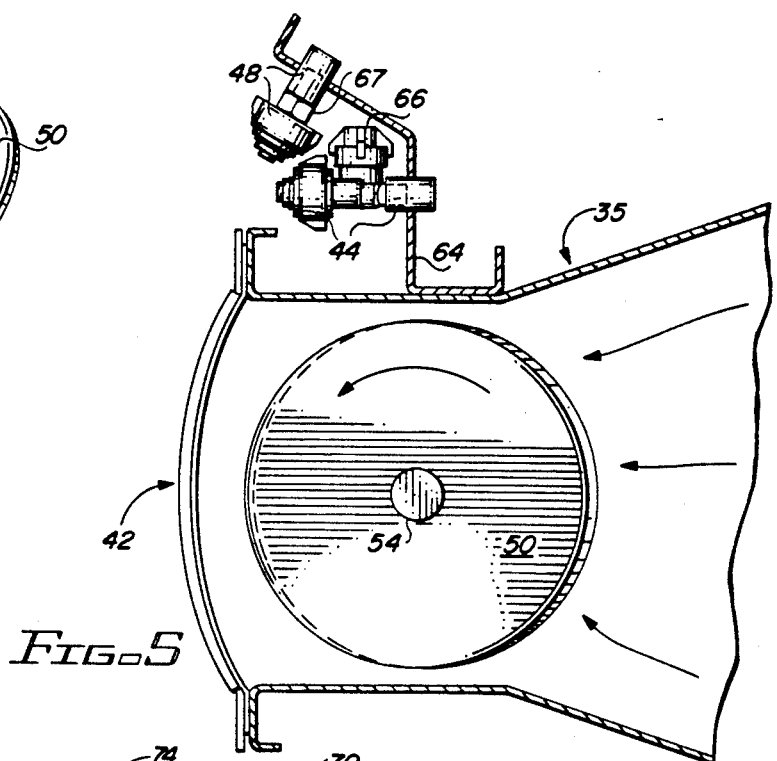
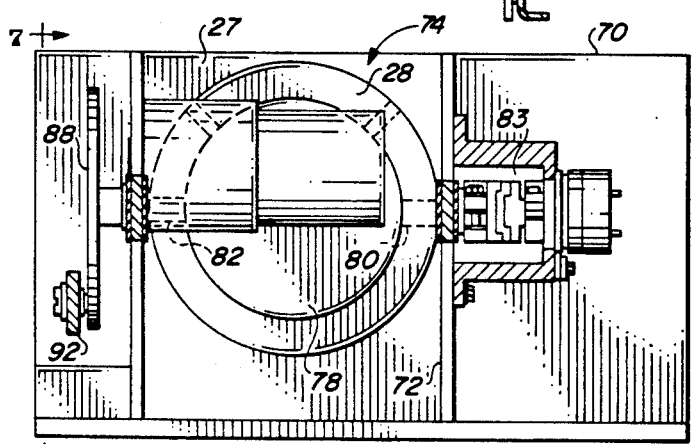
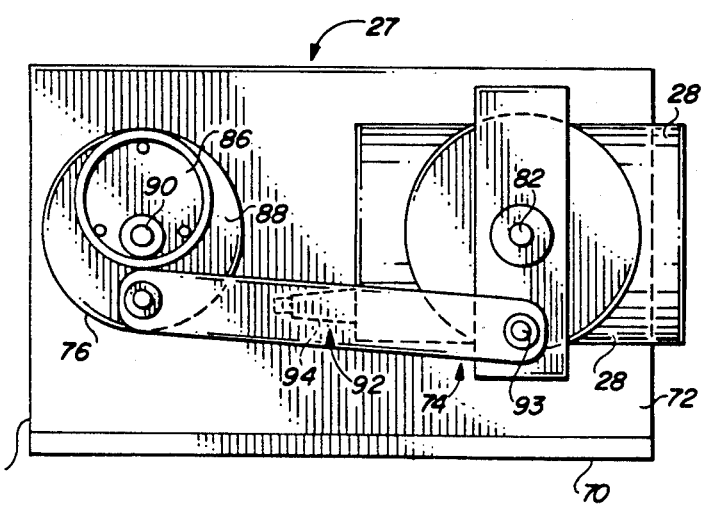

AGRICULTURAL SPRAYER

BACKGROUND OF THE INVENTION

This invention relates to an agricultural sprayer and more particularly to an apparatus for injecting pesticide, fungicides, and fertilizers into an airstream to spray foliage.

Agricultural spraying devices typically include a fan that generates a high speed air flow that is directed through a cowling at foliage. Pesticide is then directly fed through a nozzle into the air flow to spray the foliage. A few of these techniques are described in U.S. Pat. Nos. 4,347,978 and 4,768,713.

One of these techniques, described in U.S. Pat. No. 4,347,978, directs air from within a cowling and between rectangular-shaped paddles at foliage. The paddles then oscillate about a vertical axis and create turbulence in the air flow to shake leaves on the foliage. This shaking of the leaves improves pesticide coverage. However, this technique does not uniformly shake all the leaves. Further, the air turbulence created by this technique may result in some leaves covering up other leaves. Consequently, the covered leaves may not get sprayed. Further, in this technique the paddles are vertically spaced apart with air gaps between the paddles. Thus, portions of the air pass over the paddles without any direction and without any turbulence being generated.

It is desirable to simultaneously spray foliage by blowing air on both sides of the agricultural sprayer. One method to simultaneously spray two sides is to blow air on both sides of the sprayer with two fans. One blows air on one side of the sprayer and the other fan blows air on the other side. Pesticide is then injected into the air flow. Using two fans is inefficient as two motors and fan housings are needed. The inefficiency of two fans may be increased if the fans are stacked because the air from one fan may interfere with the air from the other fan.

Another method used to simultaneously spray two sides of the sprayer is by blowing air across a divider that directs the air at the foliage. Using a divider is inefficient as the divider creates a drag on the air flow. Further, the divider is undesirable as it adds weight and bulk to the agricultural sprayer.

Pesticide spray is typically injected into the air flow by locating a nozzle within the air flow itself. Liquid pesticide is fed through the nozzle into the air flow resulting in the pesticide particles being carried by the air onto the foliage. A drawback to this injection technique is that the size of the particles are not regulated. Consequently, a greater or lesser amount of pesticide may be applied than needed. When the pesticide is applied it may not be evenly dispersed resulting in too high of a concentration in one location and too low of a concentration in another location. Accordingly, some of the pesticide is wasted on portions of the foliage while other portions will have insufficient pesticide to protect the foliage from insects.

Sprayed pesticide is charged to increase its adherence to foliage. Methods of charging the pesticide are disclosed in U.S. Pat. Nos. 4,762,274, 4,565,318 and U.K. Patent Application 2 181 974 A. These methods involve first directing an air flow at the foliage to be sprayed. Second, a high-voltage electrostatic charge is placed on an electrode. Pesticide is injected into the air flow, and the air flow is passed over the electrode to charge the pesticide. A drawback to these methods is that a sprayer operator may be exposed to the high voltage causing a safety hazard. Further, pesticide may not flow into areas of close enough proximity to the electrode to become charged. Thus, maximum pesticide adherence to foliage may not be obtained.

Techniques for controlling the particle distribution of pesticide are disclosed in U.S. Pat. Nos. 4,768,713 and 4,823,268. These techniques involve using many ultrasonic sensors stacked vertically above each other in a fixed position. The sensors transmit an ultrasonic signal to detect the foliage in a zone. Nozzles associated with each sensor are vertically stacked and placed in an airstream exiting from the side of the sprayer. Each nozzle sprays into a particular zone and is associated with a sensor sensing that zone. The detector associated with the nozzle is used to turn different nozzles off and on depending on whether foliage is detected in the nozzle's zone. This technique uses many sensors. When a sensor breaks down they are expensive to replace. Further, the more sensors used, the more likely the probability of a failure, thus reducing the reliability of the sprayer.

The pesticide being injected in the nozzle is typically a mixture of water and pesticide. Methods of mixing the water and pesticide are described in U.S. Pat. Nos. 4,023,020, 4,803,626 and 4,805,086. These methods use industrial pumps to move water and pesticide into an injection line. However, if a water pump were to fail, pressure caused by the industrial pump could cause the pesticide to flow backwards into the water. This backflow results in the water being contaminated which is highly undesirable.

SUMMARY OF THE INVENTION

An object of this invention is to provide an improved method of spraying and an agricultural sprayer that more efficiently delivers pesticide to foliage.

Another object of this invention is to inject pesticide int an airstream that has turbulence which oscillates in a circular pattern to shake the foliage and more effectively cover the foliage with the pesticide.

A further object of this invention is to inject pesticide into an air flow that is directed at foliage with vertically stacked paddles that horizontally overlap to provide minimum air flow resistance.

It is also an object of this invention to generate air flow which radiates outward from both sides of a sprayer to spray foliage in a manner which reduces air drag.

An additional object of this invention is to inject pesticide into a radial air flow of an agricultural sprayer for transfer to foliage.

It is further an object that the radial air flow be cutoff in two places to more efficiently direct air to the sides of the sprayer with a single motor.

Another object of this invention is to uniformly coat foliage by directing liquid pesticide from a first nozzle into a high speed air flow with a second nozzle that releases air to control the size of the liquid pesticide spray.

It is also an object of this invention to charge pesticide used in an agricultural sprayer to increase its adherence to foliage without exposing the agricultural sprayer operator to the charging device.

A further object of this invention is to regulate the spraying of foliage with a sensor that detects the portion of foliage to be sprayed with a single oscillating sensor thereby alleviating the need for multiple sensors and thereby increasing the reliability of the sensors.

It is also an object of this invention to mix both pumped water and pesticide while preventing the pesticide from contaminating the water in the event of a water pump failure.

These and other objects are provided with an agricultural sprayer comprising a substantially oriented shaft having a vertical axis extending there through and coupled to a plurality of vertically stacked paddles extending around the shaft, means for generating an airstream and means for directing the airstream over the paddles. The sprayer further comprises means for rotating paddles on the shaft about the vertical axis, the paddles being oriented on the shaft such that when the paddles are rotated the airstream changes from an upward direction to a horizontal direction. By extending the paddles around the shaft, air flow direction is provided while decreasing air flow resistance. It is preferable that the lower portion of the paddles be horizontally aligned with the upper portion of adjacent paddles to create a turbulence that oscillates in a circular pattern to more effectively shake foliage in the trees.

An agricultural sprayer is provided for spraying liquid pesticide at foliage, the apparatus comprises means for directing airstream at the foliage, and means for injecting liquid pesticide into the airstream. The agricultural sprayer further comprises means for applying an electric charge to the liquid pesticide prior to injecting the pesticide into the airstream to prevent accidental electrocution.

Further included is an agricultural sprayer for spraying the foliage comprising means for generating an airstream directed at the foliage, means for generating a second airstream having a predetermined velocity, and means for directing said airstream into said first airstream. Also, the sprayer comprises means for injecting pesticide into the second airstream with a predetermined flow rate such that the pesticide is directed by the second airstream into the first airstream in particle form so that the size of these particles may be regulated.

In another embodiment an agricultural sprayer is included that is adapted to detect foliage to be sprayed and regulates spraying of the pesticide in accordance with the foliage detected. This sprayer comprises means for generating an airstream, means for directing the airstream at the foliage, means for injecting pesticide into the airstream using a plurality of nozzles such that the pesticide from one of the nozzles injected into the airstream is sprayed into a first zone, and the pesticide from another of the nozzles is injected into the airstream of a second zone. The sprayer has means for sensing the distance between the sprayer and the foliage in the first zone, means for changing the orientation of the sensing means to sense the distance between the sensor and the foliage in the second zone, and means responsive to the difference sensed between the two zones for adjusting the amount of pesticide sprayed. In this way only one sensor needs to be provided to detect the foliage.

In another embodiment an agricultural sprayer comprises a fan adapted to generate an airstream substantially parallel to the direction of travel of the sprayer, the fan being adapted to generate a radial airstream flowing out of the fan in a direction substantially normal to the direction of travel of the sprayer, and means for injecting pesticide into the radially flowing airstream. It is preferable that the fan be disposed in an enclosure having a first and second cut-off portion that are vertically aligned on adjacent sides of the fan. This cut-off portion would be adapted to direct air outward along a line substantially normal to the direction of travel of the sprayer. Accordingly, a single fan directs fans on both sides of the sprayer with minimum air flow resistance.

BRIEF DESCRIPTION OF THE DRAWINGS

FIG. 1 is a side view of an agricultural sprayer in accordance with the current invention;

FIG. 2 is a side view of the paddles and fan shown in FIG. 1;

FIG. 3 is a top view of the paddles and fans shown in FIG. 2;

FIG. 4 is a perspective diagram of one of the paddles shown in FIGS. 2 and 3;

FIG. 5 is a side view of the injection nozzles shown in FIG. 1 for injecting the pesticide into the airstream;

FIG. 6 is a side view of the foliage sensor shown in FIG. 1 and its relative degrees of movement;

FIG. 7 is a front view of the foliage sensor shown in FIG. 6;

DESCRIPTION OF THE PREFERRED EMBODIMENTS

Figure 8:
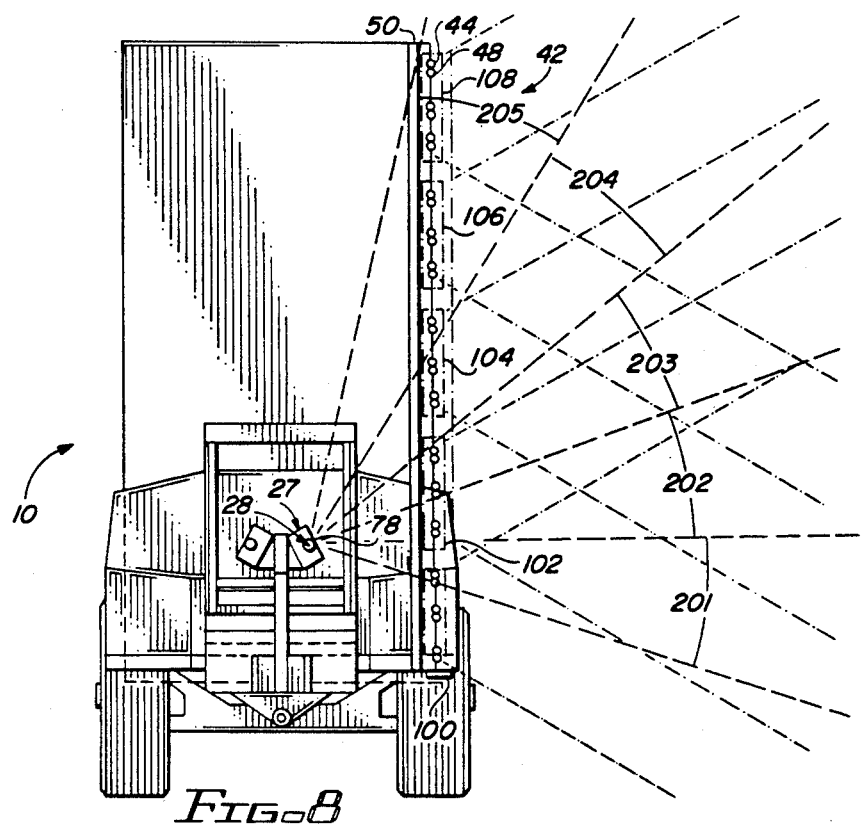
FIG. 8 is a front view of the agricultural sprayer shown in FIG. 1 with the foliage sensor movement being highlighted.

Referring to FIG. 1, there is shown a self-propelled foliage sprayer 10 that includes a frame 12, four wheels 14, operator's cab 16 and both pesticide tanks 18 and water tank 20 mounted on frame 12. An engine 22 is mounted behind the cab 16. The foliage sprayer 10 also includes speed sensor 24 mounted on frame 12 and coupled to axis 26 of wheels 14. Speed sensor 24 senses the rotational velocity of axis 26. Alternately, speed sensor 24 may include a magnet attached to wheels 14, that sense the movement of wheels 14 by sensing when the magnet passes over the sensor.

Foliage sensor 27 is mounted to the front of frame 12 and attached to operator's cab 16. Sensor 27 preferably includes an ultrasonic sensor for directing a beam of ultrasonic energy towards a selected target and sensing the reflection off that target of ultrasonic energy. Sensor 27 preferably has a horn 28 for further directing the ultrasonic sound in the direction of a predetermined spraying zone.

Foliage sprayer 10 includes a plurality of vertically stacked enclosures 32. Each enclosure 32 includes front section 34, side sections 35, rear section 36, a blower 38, a connecting section 39 (FIG. 3) and a cowling 40. Blower 38, also referred to as a fan, is mounted in each cowling 40. The enclosure 32 further includes air discharge slot 42. The blower 38 includes a motor. More details of blower 38 will be discussed later in connection with FIGS. 2 and 3. Blower 38 forces air to enter enclosure 32 through rear section 36 and front section 34 and to exit through air discharge slot 42 on side section 35. Pesticide nozzles 44 and air nozzles 48 are coupled to side section 35 and are disposed adjacent the air discharge slots 42. Pesticide nozzles inject liquid pesticide from water tank 20 and pesticide tanks 18 into the air flowing out of air discharge slot 42. This air leaving slots 42 transports liquid pesticide to foliage located on both sides of foliage sprayer 10.

Referring to FIGS. 2 and 3, there is shown an enclosure 32 that includes a slot 42, paddles 50, cowling 40 and blowers 38. One such airfoil design of enclosure 32 is Model No. 3000AFK manufactured by Chicago Blower of Chicago, Ill. Referring to FIG. 3, blowers 38 draw air radially inward from front section 34 and rear section 36. Blowers 38 then exhaust the air axially outward over paddles 50 on the left-side and right-side of foliage sprayer 10 (FIG. 1).

Blowers 38 are mounted vertically within enclosure 32, and includes propeller blades 52 mounted on drive shaft 54. Drive shaft 54 is driven with motor 55. Referring to FIG. 3, blowers 38 includes two rows of propeller blades 52 mounted about a horizontal drive shaft 54. Both rows of propeller blades 52 rotate about drive shaft 54 to draw air radially inward from front section 34 and rear section 36. Drive shaft 54 is propelled by a hydraulic motor (not shown) which is connected to shaft 54 with universal joints. One such manufacturer of this motor is manufactured by Sunstrand of Chicago, Ill. Propeller blades 52 are also curved to expel air both axially outwards through slots 42 on both sides of foliage sprayer 10 (see FIG. Each of blowers 38 include a top and bottom cut-off portion 56 and 58 that divides air being expelled outward. Cut-off portions 56 and 58 are disposed in close proximity to blades 52 to prevent the air being generated by propeller blades 52 from continuing to circle around drive shaft 54.

When the air is expelled outward by blowers 38, it is directed through paddles 50 and out slot 42. The speed of the air is preferably between 13,905 and 38,934 cu.ft./min. Paddles 50 are positioned on a vertically oriented shaft 60. Shaft 60 is propelled to rotate about its axis by motor 62 (FIG. 2).

Referring to FIG. 4, paddles 50 are preferably elliptically shaped and encircle the entire shaft 60. Referring to FIG. 2, paddles 50 are positioned on shaft 60 such that the upper portion of a first paddle 52 is horizontally aligned with the lowest portion of an adjacent paddle 52 disposed vertically above that first paddle 52. When shaft 60 rotates, paddles 50 direct the air from blower 38 upward, downward or horizontal to the ground. It is also preferable that shaft 60 rotate at a speed of 60 revolutions per minute. It is recognized that by positioning the paddles 50 in this manner, when shaft 60 is rotated the direction of the air at the foliage can be changed from an upward to a downward direction, and vice versa. It is also recognized that by positioning the paddles 50 in the manner described while rotating shaft 60, the flow of air exiting slot 42 will oscillate in a circular pattern to enhance movement of the leaves being sprayed.

Referring to FIG. 3, side section 35 of enclosure 32 is shaped to provide a build-up of pressure within blower 38. More specifically, connection section 39 of enclosure 32 is wider than slot 42. It is preferable that the width of slot 42 be 60% of connecting section 39. This tapering of enclosure 32 creates a back pressure within blowers 38.

Referring to FIG. 5 there is shown a top view of paddle 50 and side section 35. Air nozzle 48 and pesticide nozzle 44 are disposed adjacent side section 35. One such air and pesticide nozzle 44 and 48 is manufactured by Spray Systems of Wheaton, Ill. It is preferable that air nozzle 48 be positioned to direct air at a 60° angle to the flow of air exiting slot 42. It is preferable that nozzle 44 direct liquid pesticide in a direction parallel to the flow of air exiting slot 42. Air nozzle 48 receives air from a pump, details of which will be described later in connection with FIG. 9. Nozzles 44 and 48 are held in place on side section 35 with brackets 64. The release of pesticide through pesticide nozzle 44 is controlled with solenoid 66. The release of air through air nozzle 48 is controlled with solenoid 67.

During operation, blowers 38 directs air over paddles 50, out air discharge slot 42, and into the foliage beside sprayer 10 (see FIG. 1). A second airstream exiting air nozzle 48 is directed at the air flow exiting discharge slot 42. This airstream preferably pumps air out at a speed of 40 to 110 mph. Liquid pesticide is directed out of nozzle 44 into the air flow from nozzle 48 and then into air exiting slot 42. Solenoid 66 enables and disables liquid pesticide exiting nozzle 44. Solenoid 67 enables and disables air exiting nozzle 48. When solenoid 66 and 67 are enabled, liquid pesticide and air exit nozzles 44 and 48, respectively. When solenoid 66 is disabled, liquid pesticide stops exiting nozzle 44. Directing an airstream at the liquid pesticide causes droplets of liquid pesticide to form. The speed of the air exiting nozzle 48 as well as the rate of flow of the liquid pesticide through nozzle 44 sets the size of the liquid pesticide droplets. It is recognized that by changing the liquid pesticide flow rate and the speed of the air exiting nozzle 44, a spray droplet size may be set to more evenly distribute pesticide on the foliage.

Referring to FIGS. 6 and 7, there is shown a foliage sensor 27 which contains horn 28, enclosure 70 surrounding sensor section 74, and rotating motor section 76 mounted on frame 72. Sensor section 74 is also mounted on frame 72 and includes a horn 28 enclosing transducer 78. Horn 28 is mounted on shafts 80 and 82 that are connected to frame 72. One such foliage sensor 27 and horn 28 is Model No. DCUFT manufactured by Lundahl Instruments, Inc. of Logan, Utah.

Also mounted to frame 72 within enclosure 70 and connected to shaft 80 is position transducer 83. Position transducer 83 senses the orientation of horn 28 and provides a signal to computer system 84 in response to changes in the orientation of horn 28. More details of this computer system 84 will be discussed in connection with FIG. 9.

Mounted to frame 72 is motor section 76. Motor section 76 includes stepper motor 86 rotating crescent arm 88 through shaft 90. Motor section 76 crescent arm 88 is connected through arm 92 to a pivot screw 93 on horn 28. One such manufacturer of motor section 76 is K-Tec of Sarasota, Fla. Stepper motor 86 is controlled by signals fed from computer system 84 and rotates crescent arm 88. Rotating arm 88 results in arm 92 exerting forces on horn 28 to cause horn 28 to rotate about shafts 80 and 82. Position transducer 83 senses changes in the orientation of horn 28. Transducer 78 is coupled to computer system 84 through cable 94. Computer system 84 sends a signal to activate transducer 78 as horn 28 rotates about shafts 80 and 82 indicating the orientation of horn 28.

Referring to FIG. 8 there is shown sections 101–105 sampled by foliage sensor 27 depending on its position. Also shown are zones 201–205 that contain a pesticide nozzle 44, paddles 50 and air nozzle 48 for injecting pesticide into the air flow exiting slot 42. Stepper motor 86 rotates horn 28 of foliage sensor 27 into an orientation where the foliage in one of the sections 101–105 may be sampled. When the foliage in sections 101–105 is sampled, a distance signal is sent to the computer system 84 (FIG. 9). This signal indicates the distance between the foliage sensor 27 and the foliage within sampled sections 101-105.

The computer system 84 determines if the distance signal in each of the zones is within a predetermined range. This range is preferably between three and fourteen feet. After determining the range of the distance signals, computer system 84 enables solenoids 66 and 67 (FIGS. 5 and 8) to spray the zones having distance signals in the predetermined range. Also, after determining the range of the distance signals, computer system 84 disables the solenoids that spray the zones outside the predetermined range.

An example of detection and spraying operation is as follows. Foliage sensor 27 is first oriented to aim transducer 78 at zone 101, and then at sections 102-105. Foliage sensor 27 then sends the distance signal to computer system 84 for each of the sampled zones. If the distance signal in zone 101 is within the predetermined range, computer system 84 enables solenoids 66 and 67 in zone 201 when paddles 50 are oriented upwards and enables solenoids 66 and 67 in zone 202 when paddles 50 are oriented downwards to spray zone 101. If the distance signals from sections 102-105 are outside the predetermined range, the foliage in zones 102-105 would not be sprayed.

It is recognized that by using a single transducer 78 to sense the foliage, only one foliage sensor 27 must be maintained. Maintaining only one foliage sensor 27 reduces the maintenance costs and increases the reliability of the system.

Figure 9:
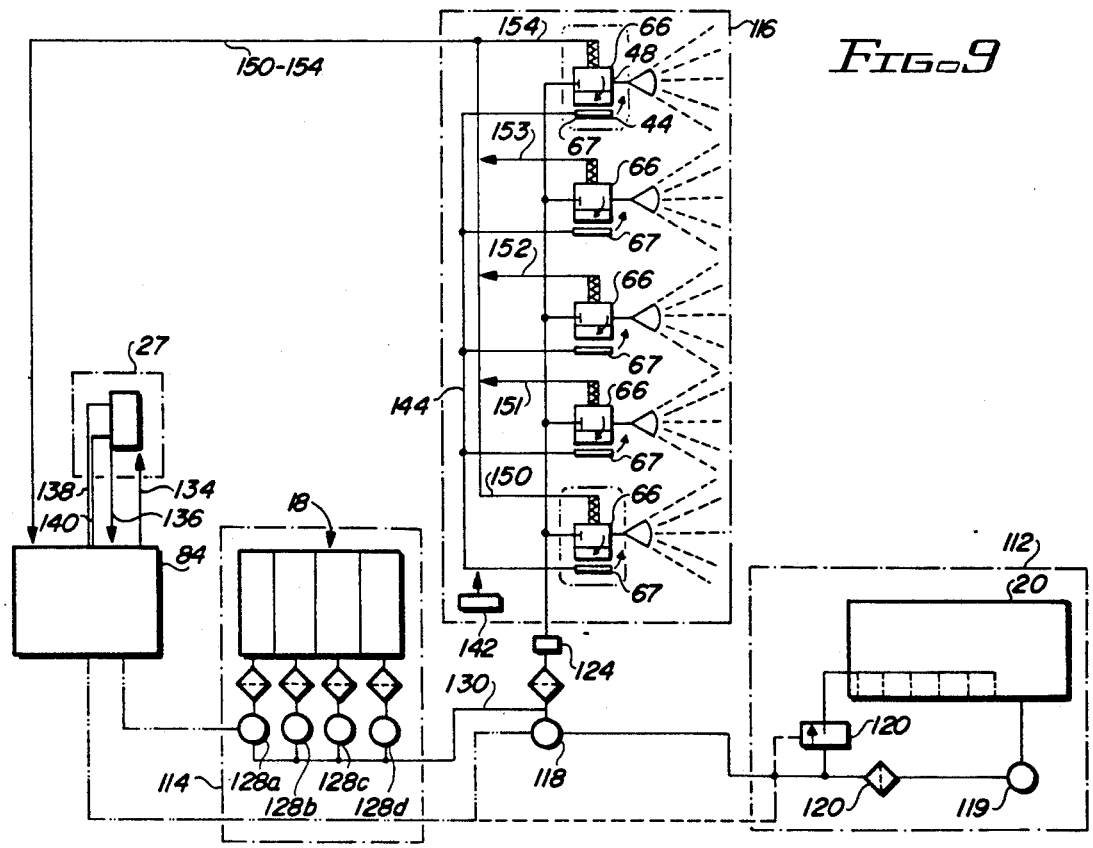
FIG. 9 is a schematic diagram of the fluid and control system for the sprayer shown in FIG. 1 with a charge device and backflow protection.

Referring to FIG. 9 there is shown a schematic diagram of the pesticide flow and control system. Foliage sprayer 10 is controlled with computer system 84. This computer system 84 may include any electronically controlled system. One such system is manufactured by Penn Systems of Broomall, Pa., Model No. 220. Computer system 84 is coupled to water mixing system 112, pesticide mixing system 114, spray distribution system 116, meter 118 and foliage sensor 27.

Water mixing system 112 is coupled through meter 118 and electromagnetic charge device 124 to spray distribution system 116. Water mixing system 112 includes water tank 20 coupled to pump 119 and level sensor 120. Disposed between pump 119 and level sensor 120 is backflow prevention valve 122. Pump 119 pulls water out of water tank 20 and then pumps water through backflow prevention valve 122 through meter 118 and electromagnetic charge device 124 to spray distribution system 116. Level sensor 120 monitors the level of water in water tank 20. Level sensor 120 provides a signal to computer system 84 in accordance with the water level in water tank 20. Meter 118 provides a signal to computer system 84 indicating the quantity of water pumped out of water tank 20.

Pesticide mixing system 114 includes pesticide tank 18 (a-d). Each pesticide tank 18 (a-d) contains a different liquid pesticide. Coupled to each of the pesticide tanks 18 are pumps 128 (a-d) for pumping a predetermined amount of liquid pesticide out of pesticide tanks 18 (a-d). These liquid pesticides are combined on line 130 with the water from water tank 20. The combined liquid pesticide and water mixture are fed through electromagnetic charge device 124 and then applied to spray distribution system 116. Pumps 128 (a-d) are controlled by computer system 84. One such computer system 84 is Model No. 200 manufactured by Mitsubishi of Japan.

Computer system 84 is coupled to foliage sensor 27 through lines 134, 136, 138 and 140. Computer system 84 provides a signal on line 134 indicating that transducer 78 (FIG. 6) of foliage sensor 27 is to send out an ultrasonic pulse. Computer system 84 receives a signal from sensor 27 on line 136 indicating the distance of the foliage from the sensor 27. Computer system 84 provides a signal on line 140 to set the position of stepper motor 86 (FIG. 7) and change the orientation of transducer 78 within foliage sensor 27. Foliage sensor 27 provides a signal on line 140 indicating to the computer system 84 the current position of foliage sensor 27. Computer system 84 processes these signals from foliage sensor 27 and turns "off" and "on" solenoids 66 and 67 in each of zones 201-205 (FIG. 8).

Spray distribution system 116 includes solenoids 66 and 67, air pump 142 coupled to nozzle 48 through line 144. Solenoids 66 and 67 in sections 100-108 are coupled to computer system 84 through lines 150-154. Computer system 84 turns solenoids 66 and 67 "off" and "on" in response to signals from foliage sensor 27 as previously described. Air pump 142 feeds air through line 144 having a high velocity flow rate.

Electromagnetic charge device 124 electrically charges the liquid from water mixing system 112 and pesticide mixing system 114 being applied to spray distribution system 116. One such electromagnetic charge device is Model No. Energizer 0.75 manufactured by Agri-Mart, Inc. of Hudson, Fla., preferably having a three-fourth-inch line. Charge device 124 applies a voltage potential across the liquid pesticide being fed to spray distribution system 116. The purpose of this voltage potential is to charge the liquid pesticide so that when the liquid pesticide is applied to the foliage, adherence is improved. It is recognized that charging the liquid pesticide before being injected into the air flow alleviates the need for exposed high voltage charging plates, that when touched, may cause electrocution.

Water mixing system 112 includes a backflow prevention valve 122 such as a two-inch gate valve with servo electric motor. In the event of pump 119 failure, pesticide from pesticide mixing system 114 is prevented by valve 122 from entering water tank 20.

This concludes the description of the preferred embodiments. A reading by those skilled in the art will bring to mind various changes without departing from the spirit and scope of the invention. It is intended, however, that the invention only be limited by the following appended claims.

What is claimed is:

1. An agricultural sprayer for applying pesticide to foliage comprising:
   a substantially vertically oriented shaft having a vertical axis extending therethrough and coupled to a plurality of vertically stacked paddles extending around said shaft;
   means for generating an airstream;
   means for directing said airstream over said paddles;
   means for injecting the pesticide into said airstream;
   means for continuously rotating said paddles on said shaft about said vertical axis; and
   said paddles being oriented on said shaft such that when said paddles are continuously rotated, said airstream continuously varies between an upward direction and a horizontal direction to shake the leaves on the foliage up and down, and when said air direction varies said pesticide in the airstream effectively covers the foliage.

2. The agricultural sprayer as recited in claim 1 wherein the lower portion of said paddles are substantially horizontally aligned with the upper portion of the paddle stacked below.

3. The agricultural sprayer as recited in claim 1 wherein said paddles have a top surface which are aligned in parallel along the entire length of said shaft.

4. The agricultural sprayer as recited in claim 1 wherein said paddles rotate about said shaft at a rate that creates turbulence in the airstream to shake the foliage.

5. The agricultural sprayer as recited in claim 1 wherein said paddles are substantially elliptically-shaped.

6. The agricultural sprayer as recited in claim 1 wherein when said paddles are rotated said airstream further changes from a horizontal direction to a downward direction.

7. An agricultural sprayer comprising:
a plurality of vertically stacked paddles extending along substantially the entire length of a substantially vertically oriented shaft, said paddles having a lower portion and an upper portion, said lower portion of substantially all of said paddles being substantially horizontally aligned with the upper portion of an adjacent paddle;
means for generating an airstream that flows over said paddles;
means for directing pesticide into said airstream;
means for rotating said paddles on said shaft such that when said paddles are rotated said pesticide in said airstream changes from a first direction to a second direction; and
said paddles being oriented on said shaft such that when said paddles are continuously rotated, said airstream continuously varies between an upward direction and a horizontal direction to shake the leaves on the foliage up and down, and when said air direction varies said pesticide in the airstream effectively covers the foliage.

8. The sprayer as recited in claim 7 wherein substantially all of said paddles have a planar top surface oriented in parallel to each other.

9. An agricultural sprayer for spraying foliage comprising:
blower means having a cowling for directing a first airstream through the cowling and at the foliage;
means for generating a second airstream at a predetermined velocity;
means external of said cowling for directing said second airstream into said first airstream after said first airstream has exited said cowling;
means external to said cowling for injecting pesticide into said second airstream with a predetermined flow rate such that said pesticide is directed in particle form by said second airstream into said first airstream after exiting said cowling; and
means for continuously varying the direction of said first airstream in said cowling between an upward direction and a horizontal direction.

10. The agricultural sprayer as recited in claim 9 wherein said second airstream is directed with a nozzle.

11. The agricultural sprayer as recited in claim 9 wherein said directing means directs said second airstream flow at a predetermined angle to the direction of flow of said first airstream.

12. The agricultural sprayer as recited in claim 1 wherein said predetermined angle is about 60°.

13. The agricultural sprayer as recited in claim 9 further comprising solenoid means for changing the velocity of said second airstream to change the size of said pesticide particles.

14. The agricultural sprayer adapted to detect foliage to be sprayed and regulating spraying of a pesticide in accordance with the foliage detected, the sprayer comprising:
means for generating an airstream;
means for directing said airstream at the foliage;
means for injecting pesticide into said airstream using a plurality of nozzles such that the pesticide from one of said nozzles injected into the airstream is dispersed into a first zone of foliage and the pesticide from another of said nozzles injected into the airstream is dispersed into a second zone of foliage;
sensing means having a first position for sensing the distance between the sprayer and the foliage in the first zone, and having a second position for sensing the distance between the sprayer and the foliage in the second zone;
means for continuously changing the position of said sensing means between said first position and said second position; and
means responsive to the distance sensed between the sprayer and the foliage in the first and second zone for adjusting the amount of pesticide sprayed into the first and second zone.

15. The agricultural sprayer as recited in claim 14 wherein the position of said sensing means is changed by continuously rotating said sensing means about a horizontal axis.

16. The agricultural sprayer as recited in claim 15 wherein said first and second zones are positioned in a vertical line and wherein said nozzles are vertically aligned on said sprayer.

17. The agricultural sprayer as recited in claim 15 wherein said sensing means includes an ultrasonic transducer adapted to rotate about a horizontal axis to sense the first and second zone.

18. An agricultural sprayer for spraying foliage comprising:
first and second vertically oriented fans having paddles operative to rotate about an axis to generate an axial airstream flowing into said fans, and operative to generate an airstream flowing radially outward from to said axis;
first and second cutoff means disposed between said first and second fan for preventing cavitation of air flowing in the direction of rotation of the paddles;
means for partially enclosing said first and second fans; and
first cutoff means disposed between the first and second fans and in close proximity to said first fan, and second cutoff means disposed between the first and second fans and in close proximity to the second fan, each of the first and second cutoff means comprising an angled plate fixed with the fan enclosing means and each angled plate extending to an apex adjacent to the periphery of the respective fan, whereby each cutoff means prevents cavitation of air flowing in the direction of rotation of the paddles of the respective fans.

19. The agricultural sprayer as recited in claim 18 further comprising means for restricting the outwardly directed air to increase pressure build-up in said air adjacent said fan.

20. The agricultural sprayer as recited in claim 18 further comprising means for redirecting said outwardly directed air from an upward direction to a downward direction before injecting said pesticide control substance into said air to shake the foliage.

* * * * *